June 18, 1968  D. E. HERMAN ET AL  3,388,797
MATERIAL CLASSIFYING APPARATUS
Filed May 24, 1965  3 Sheets-Sheet 1
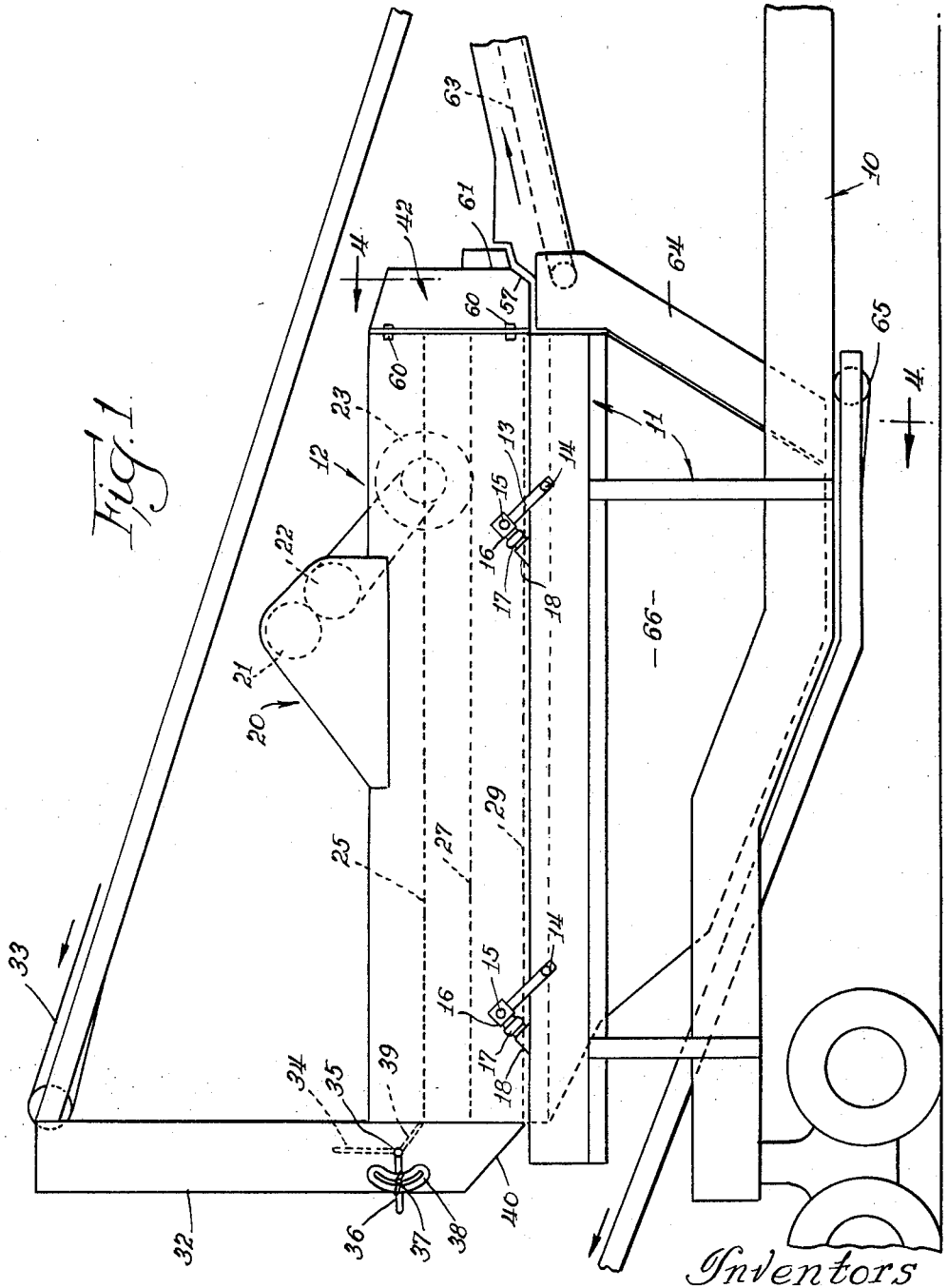
Inventors
Don E. Herman,
Albert B. Hanse
and Paul R. Vifian
By Darbo, Robertson &
Vandenburgh  Att'ys.

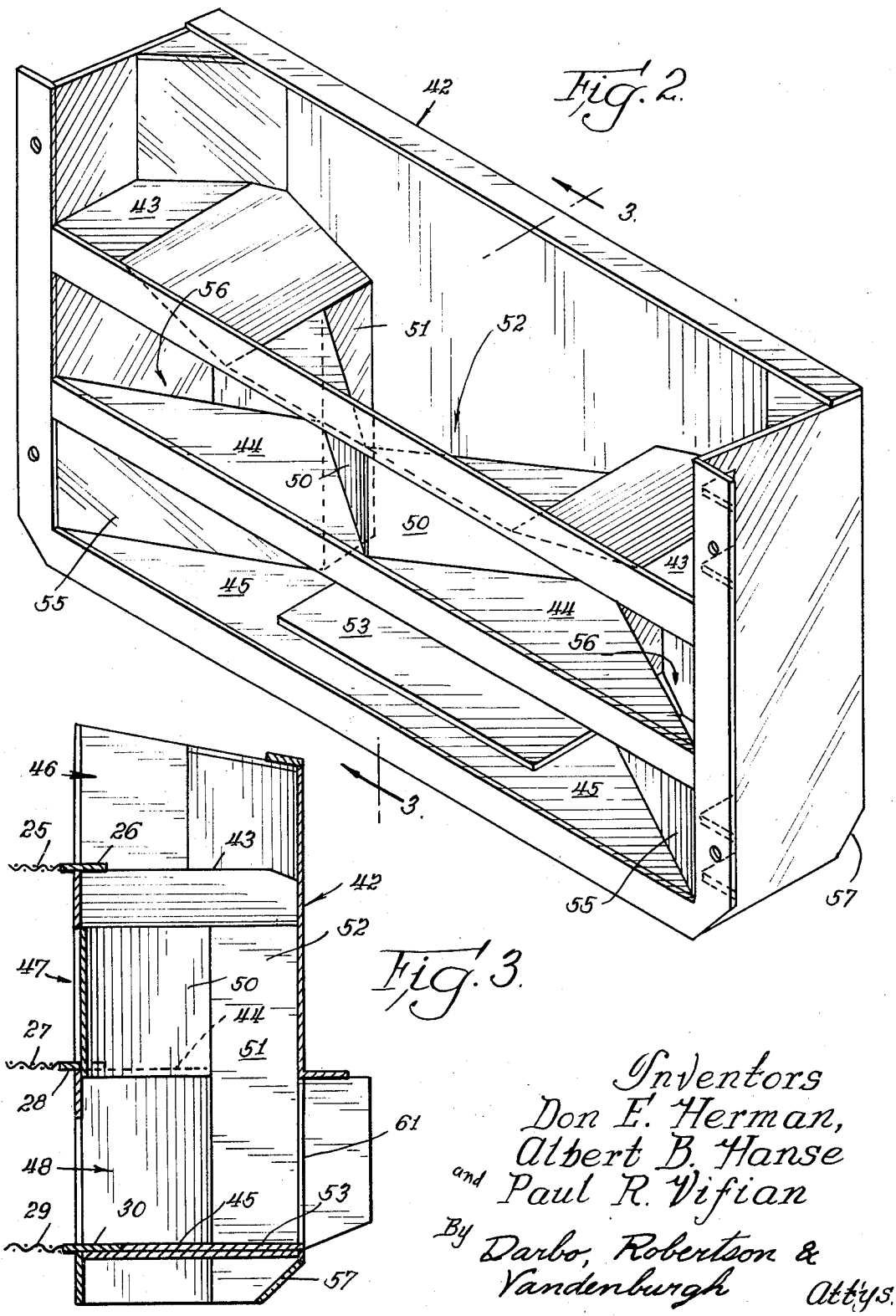

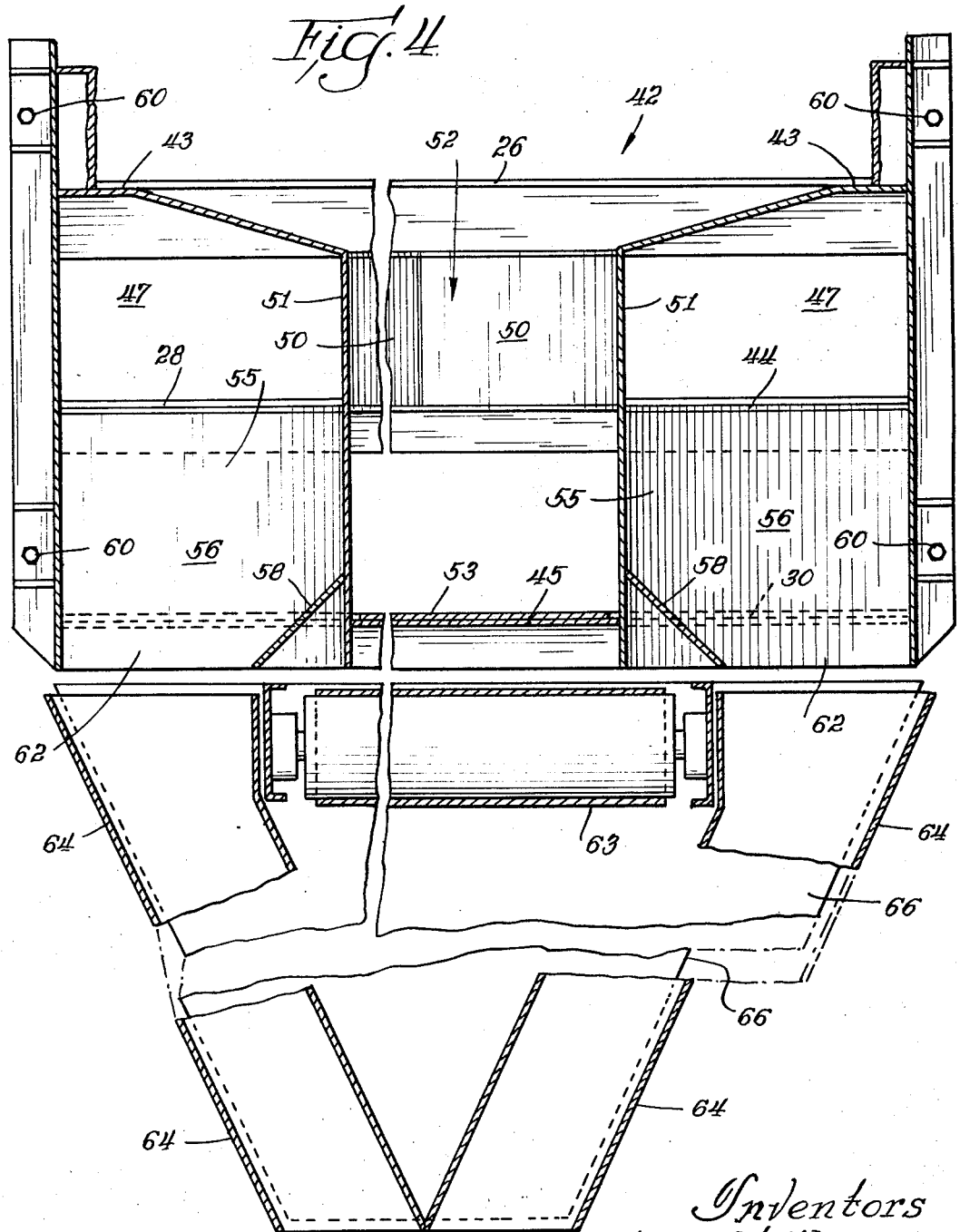

United States Patent Office 3,388,797
Patented June 18, 1968

3,388,797
MATERIAL CLASSIFYING APPARATUS
Donald E. Herman, Albert B. Hanse, and Paul R. Vifian, Cedar Rapids, Iowa, assignors to Pettibone Mulliken Corporation, a corporation of Delaware
Filed May 24, 1965, Ser. No. 457,989
6 Claims. (Cl. 209—241)

ABSTRACT OF THE DISCLOSURE

A material classifying apparatus is provided. There are three superposed classifying screens. The top and bottom screens have a relatively coarse mesh as compared to that of the intermediate screen. The screens are all mounted on a frame which vibrates so that the material on the screen moves from one end of the screens to the other. The feed stock is all delivered to a chute at the entrance end of the screens. From the chute the feed stock is delivered to the top and bottom screens in some predetermined proportion determined by a movable feed gate in the chute. At the discharge end of the screens is a triplex hopper which extends across the discharge end of the screens. It has upper, intermediate and lower intake levels in juxtaposition with the discharge end of the three screens respectively. In the hopper a central chute extends from the upper to the lower level with the hopper defining a first discharge opening at the lower level, side chutes at opposite sides of the central chute and separated therefrom which side chutes have intake openings at each side of the intermediate level and discharge openings below the lower level, and plow means at the intermediate level and on the screen side of the central chute to direct the material flow from the intermediate screen into the intake openings of the two side chutes. The central chute feeds a rework conveyor going back to the crusher. A discharge conveyor is positioned below the lower screen and there is a chute to guide material from underneath the lower screen onto the discharge conveyor. The side chutes of the triplex hopper also feed the discharge conveyor.

The present invention relates to improvements in materials classifying apparatus of the screen type.

The principal object of the present invention is to provide a material classifying apparatus having a compact overall configuration in relation to the screen area. Thus, the embodiments of the present invention are particularly adapted for screening apparatus mounted on vehicles where space, particularly width, is restricted. They also are suitable for use in other installations where floor space is at a premium. The configuration is such that savings in overall manufacturing costs are achieved as compared to other classifying apparatus of a comparable screen area.

Further objects and advantages will become apparent from the following description taken in conjunction with the drawings, in which:

FIGURE 1 is an elevationl view of an embodiment of the invention;

FIGURE 2 is a perspective view of the triplex hopper employed in the embodiment of FIGURE 1;

FIGURE 3 is a partial section as viewed at line 3—3 of FIGURE 2; and

FIGURE 4 is a section as viewed at line 4—4 of FIGURE 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements or combinations in which the inventive concepts are found.

FIGURE 1 illustrates a portion of a portable crushing plant for rock, coal, and the like. The complete plant which includes a rock crusher (not shown) and the material classifying apparatus of the present invention is mounted on a vehicle chassis, generally 10. The material classifying apparatus includes a fixed frame, generally 11, on which is mounted a movable screen box, generally 12, serving as a movable frame. Lever arms 13 are pivotally connected to the fixed frame 11 and to the movable frame 12 at pivot points 14 and 15, respectively. An abutment 16 on the movable frame 12 bears against an air cushion 17 which, in turn, rests on a fixed abutment 18 on frame 11. Shaker means, generally 20, is secured to screen box 12. In the illustrated embodiment the shaker means comprises a pair of eccentrically weighted rolls 21 and 22 rotating in opposite directions and driven by motor 23. The effect is such that material deposited on the screens at the left side in FIGURE 1 will be moved toward the right side thereof. The structure and operation of such shaker means is well known to those skilled in the art.

Within screen box 12 is an upper screen 25 held in a frame 26, an intermediate screen 27 held in a frame 28 and a lower screen 29 held in a frame 30. Other supports (not shown) are provided for the screens, as required. The upper and lower screens 25 and 29 are relatively coarse (large mesh) as compared to the intermediate screen 27. For example, the upper screens might have a one inch mesh while the intermediate screen had a three-sixteenth inch mesh. The exact sizes will be determined by the requirements of the user. The material that fails to pass through any of the screens is returned to the rock crusher for further crushing. The material that passes through the upper and lower screens is of a size that can be used, either as is, or after a further separation in which the fines are removed.

The material to be classified is delivered to screens 25 and 29 through a chute 32 from a feed conveyor 33. Chute 32 is in the form of a rectangular tube. It has a gate 34 pivotally mounted on a shaft 35 extending transversely across the chute. A handle 36 is secured to shaft 35 and has a clamping bolt 37 to releasably fix the handle to a fixed quadrant 38. From a point immediately adjacent shaft 35 a deflector 39 extends downwardly to the entering end of screen 25. Of course, there is an opening in chute 32 at the bottom end of deflector 39 so that the material will move from the deflector onto screen 25. This material will comprise that material which passes to the right of gate 34 as seen in FIGURE 1. The material that passes to the left of gate 34 continues on down the chute until reaching the sloping bottom 40 which directs the material to an opening in the chute at the entrance end of screen 29. By releasing bolt 37 and moving handle 36, the proportions of material from conveyor 33 going to screens 25 and 29, respectively, may be varied. Other deflectors (not shown) may be employed in chute 32 to obtain a relatively even distribution of material across the width thereof and thus across the width of the screens.

At the discharge end of the screens is a triplex hopper unit, generally 42. The hopper unit defines an upper level 43, an intermediate level 44 and a lower level 45. The upper level has an intake opening 46, the intermediate level an intake opening 47 and the lower level an intake opening 48. Screens 25, 27 and 29 are positioned so as to discharge the material from above the screens into the intake openings 46, 47 and 48, respectively. Intermediate level 44 is divided by angular walls 50 into two sections. Angular walls 50 along with vertical walls 51 define a central chute 52 extending between the upper level 43 and the lower level 45. At the base of chute 52 is a wear plate 53.

Angular side walls 55 at the bottom level 45 and vertical walls 51 define two side chutes 56 extending downwardly from the intermediate level 44. In the triplex hopper there are a rear deflector 57 (FIGURES 1-3) and side deflectors 58 (FIGURE 4) at the lower end of chutes 56.

The triplex hopper 42 is secured to the screen box 12 as by means of bolts 60 which extend through openings in flanges in the two portions. Thus, the triplex hopper is vibrated along with the screens. The material moving across the top of the screens enters the respective levels of the hopper. The material thus entering the hopper from screens 25 and 29 proceeds to a discharge opening 61. The material entering the triplex hopper from screen 27 is divided into two streams by walls 50 which serve as a dividing plow. These two streams enter the two chutes 56 and proceed to discharge openings 62 at the bottom of the opposite sides of the triplex hopper.

The material exiting through discharge opening 61 drops onto a return conveyor 63 which takes this oversize material back to the crusher for reworking. The material from the two discharge openings 62 enters two transfer chutes 64 which converge at a point immediately above a discharge conveyor 65. Transfer chutes 64 are mounted on fixed frame 11 as is a discharge chute or hopper 66. Chute 66 has a mouth the size of, and immediately below, the bottom screen 29 to thus receive the material which passes through that screen. At the bottom chute 66 converges so that the material it receives is also deposited on discharge conveyor 65.

The material entering feed chute 32 is proportioned between upper screen 25 and lower screen 29. As this material moves to the right in FIGURE 1, that portion of the material which is below the screen size passes through the screen. The material passing through screen 29 drops directly into chute 66 and onto conveyor 65. The material passing through screen 25 is divided into two streams. One stream, consisting of the large material, continues along the top of screen 27 to the discharge end thereof. The fines which pass through screen 27 fall onto screen 29 and then through that screen into chute 66. However, these fines will be such a small proportion of the total material handled that the quantity thereof will not serve to overload screen 29. Should there be some overloading of screen 29 under certain circumstances (determined by the character of the rock, the crusher, etc.), this may be adjusted either by reducing the opening size in screen 27, by moving gate 34 counter-clockwise (in FIGURE 1), or both. The large material which does not pass through screens 25 and 29 enters triplex hopper 42 at the top and bottom levels thereof and proceeds to discharge opening 61. The material which does not pass through screen 27 enters the intermediate opening 47 of the triplex hopper, is divided between the two side chutes 56 and from there is delivered to conveyor 65.

We claim:

1. In a material classifying apparatus having vibrating frame means and for use with a feed conveyor and a discharge conveyor to classify a single given feed stock of material, the improvement comprising: an upper classifying screen, an intermediate classifying screen below said upper screen, a lower classifying screen below said intermediate screen, said screens being mounted on said frame so that material on the screens tends to move from one end of the screen to the other, the upper and lower screen having relatively coarse mesh as compared to the intermediate screen; means at said one end of the screens to direct the feed stock from the feed conveyor onto said upper and lower screens at the one end thereof, the feed stock to the upper and lower screens being the same given feed stock; means at said other end of the screens to receive material from the top of the intermediate screen and to deliver it to the discharge conveyor and to receive material from the top of the upper and lower screens and to combine the material from the two in the same physical condition as received from the two, and means below the lower screen to receive material passing through the lower screen and to deliver it to the discharge conveyor.

2. In a material classifying apparatus having vibrating frame means and for use with a feed conveyor and a discharge conveyor to classify a given feed stock of material, the improvement comprising: an upper classifying screen, an intermediate classifying screen below said upper screen, a lower classifying screen below said intermediate screen, said screens being mounted on said frame so that material on the screens tends to move from one end of the screens to the other, the upper and lower screens having relatively coarse mesh as compared to the intermediate screen; a chute at said one end of said screens and having material discharge openings at said one end of the top and bottom screens, said chute having an intake positioned to receive feed stock from the feed conveyor, gate means associated with said chute to control the flow of material from the intake to the discharge openings, means at said other end of the screens to receive material from the top of the intermediate screen and to deliver it to the discharge conveyor and to receive material from the top of the upper and lower screens and to combine the material from the two in the same condition as received from the two, and means below the lower screen to receive material passing through the lower screen and to deliver it to the discharge conveyor.

3. An apparatus as set forth in claim 2, wherein said chute is generally a vertical tube, and said gate means comprises a gate extending transversely in said tube and pivotally mounted for movement about a transverse axis parallel to said one end, in about the middle of the chute and above the two openings, and including deflector means above the upper opening and extending downwardly from about the pivotal mounting towards said upper opening.

4. In a material classifying apparatus having vibrating frame means and for use with a feed conveyor and a discharge conveyor to classify a single given feed stock of material, the improvement comprising: an upper classifying screen, an intermediate classifying screen below said upper screen, a lower classifying screen below said intermediate screen, said screens being mounted on said frame so that material on the screens tends to move from one end of the screens to the other, the upper and lower screens having relatively coarse mesh as compared to the intermediate screen; means at said one end of the screens to direct feed stock from the feed conveyor to said one end of the upper and lower screens, the feed stock to the upper and lower screens being the same given feed stock; means at said other end of the screens to receive material from the top of the intermediate screen and to deliver it to the discharge conveyor and to receive material from the top of the upper and lower screens and to combine the material from the two, the last means including two discharge chutes beyond said other end, one discharge chute having intake openings at the level of the upper screen and at the level of the lower screen, the other chute having an intake opening at the level of the intermediate screen, and means below the lower screen to receive material passing through the lower screen and to deliver it to the discharge conveyor.

5. In a material classifying apparatus having vibrating frame means and for use with a feed conveyor and a discharge conveyor, the improvement comprising: an upper classifying screen, an intermediate classifying screen below said upper screen, a lower classifying screen below said intermediate screen, said screens being mounted on said frame so that material on the screens tends to move from one end of the screens to the other, the upper and lower screens having relatively coarse mesh as compared to the intermediate screen; a chute at said one end of said screens and having material discharge openings at said one end of the top and bottom screens, said chute having an intake positioned to receive material from the feed conveyor, gate means associated with said chute to control the flow of material from the intake to the discharge openings, a triplex hopper means extending across the other end of said screens including an upper, an intermediate and a lower intake level in juxtaposition with the other ends of the three screens respectively, a central chute extending from the upper to the lower level, said hopper means defining a first discharge opening at the lower level, side chutes at opposite sides of the central chute and separate therefrom, said side chutes having intake openings at each side of the intermediate level and discharge openings below the lower level, plow means at the intermediate level and on the screen side of the central chute to direct the material flow from the intermediate screen into the intake openings of the two side chutes, and means below the lower screen to receive material passing through the lower screen and to deliver it to the discharge conveyor.

6. A material classifying apparatus comprising: a movably mounted frame; triplex hopper means mounted on said frame and having three material receiving levels positioned one above the other, said means defining an intake for each level, each of said intakes being substantially the same length, a central chute extending from the upper to the lower level, said hopper means defining a first discharge opening at the lower level, side chutes at opposite sides of the central chute and separate therefrom, said side chutes having intake openings at each side of the intermediate level and discharge openings below the lower level; an upper and a lower classifying screen mounted on said frame, the upper screen having an end at the upper level intake and extending in a given direction from said end, the lower screen having an end at the lower level intake and extending in said direction therefrom; material receiving means mounted on said frame and positioned between the screens, said receiving means having an end at the intermediate level intake and extending in said direction therefrom, said receiving means being adapted to intercept part of the material falling through the upper screen; vibrating means connected to said frame to move the frame in a manner such that material on the screens is moved in the reverse of said direction; receiving means below said lower screen to receive material passing through the lower screen; and feeding means to deliver material onto the screens.

References Cited

UNITED STATES PATENTS

| | | | |
|---|---|---|---|
| 182,028 | 9/1876 | McGinnis | 209—246 |
| 2,276,333 | 3/1942 | Ovestrud | 209—316 X |
| 2,683,533 | 7/1954 | Paul | 209—315 X |
| 3,016,203 | 1/1962 | Sears | 209—315 X |

FOREIGN PATENTS

| | | |
|---|---|---|
| 569,662 | 2/1933 | Germany. |

HARRY B. THORNTON, *Primary Examiner.*

FRANK W. LUTTER, *Examiner.*

R. HALPER, *Assistant Examiner.*